US009817763B2

(12) United States Patent
Robertson et al.

(10) Patent No.: US 9,817,763 B2
(45) Date of Patent: Nov. 14, 2017

(54) METHOD OF ESTABLISHING PRE-FETCH CONTROL INFORMATION FROM AN EXECUTABLE CODE AND AN ASSOCIATED NVM CONTROLLER, A DEVICE, A PROCESSOR SYSTEM AND COMPUTER PROGRAM PRODUCTS

(71) Applicants: Alistair Robertson, Glasgow (GB); Nancy Amedeo, Austin, TX (US); Mark Maiolani, East Kilbride (GB)

(72) Inventors: Alistair Robertson, Glasgow (GB); Nancy Amedeo, Austin, TX (US); Mark Maiolani, East Kilbride (GB)

(73) Assignee: NXP USA, Inc., Austin, TX (US)

( * ) Notice: Subject to any disclaimer, the term of this patent is extended or adjusted under 35 U.S.C. 154(b) by 177 days.

(21) Appl. No.: 14/759,206

(22) PCT Filed: Jan. 11, 2013

(86) PCT No.: PCT/IB2013/050257
§ 371 (c)(1),
(2) Date: Jul. 3, 2015

(87) PCT Pub. No.: WO2014/108754
PCT Pub. Date: Jul. 17, 2014

(65) Prior Publication Data
US 2015/0356016 A1    Dec. 10, 2015

(51) Int. Cl.
*G06F 12/0862*    (2016.01)
*G06F 12/02*    (2006.01)
(Continued)

(52) U.S. Cl.
CPC ...... *G06F 12/0862* (2013.01); *G06F 9/30054* (2013.01); *G06F 9/3802* (2013.01);
(Continued)

(58) Field of Classification Search
CPC .. G06F 12/00; G06F 12/0246; G06F 12/0873; G06F 12/0862; G06F 9/06;
(Continued)

(56) References Cited

U.S. PATENT DOCUMENTS 5,692,168 A * 11/1997 McMahan ............. G06F 9/3806
711/E12.018
6,415,356 B1    7/2002 Chaudhry et al.
(Continued)

OTHER PUBLICATIONS

Wedig, R. G. and Rose, M. A., "The reduction of branch instruction execution overhead using structured control flow", 1984, SIGARCH Comput. Archit. News 12, 3 (Jan. 1984), 119-125. DOI: https://doi.org/10.1145/773453.808173.*
(Continued)

*Primary Examiner* — Reginald Bragdon
*Assistant Examiner* — Aaron D Ho (57) ABSTRACT

A method of establishing pre-fetch control information from an executable code is described. The method comprises inspecting the executable code to find one or more instructions corresponding to an unconditional change in program flow during an execution of the executable code when the executable code is retrieved from a non-volatile memory comprising a plurality of NVM lines. For each unconditional change of flow instruction, the method comprises establishing a NVM line address of the NVM line containing said unconditional change of flow instruction; establishing a destination address associated with the unconditional change of flow instruction; determining whether the destination address is in an address range corresponding to a NVM-pre-fetch starting from said NVM line address; establishing a pre-fetch flag indicating whether the destination address is in the address range corresponding to a NVM-pre-fetch starting from said NVM line address; and record-
(Continued)

ing the pre-fetch flag in a pre-fetch control information record.

18 Claims, 7 Drawing Sheets

(51) Int. Cl.
   *G06F 12/0873*   (2016.01)
   *G06F 12/00*     (2006.01)
   *G06F 9/30*      (2006.01)
   *G06F 9/38*      (2006.01)

(52) U.S. Cl.
   CPC ............ *G06F 9/3814* (2013.01); *G06F 12/00* (2013.01); *G06F 12/0246* (2013.01); *G06F 12/0873* (2013.01); *G06F 2212/461* (2013.01); *G06F 2212/6026* (2013.01); *G06F 2212/6028* (2013.01); *G06F 2212/7201* (2013.01)

(58) Field of Classification Search
   CPC .... G06F 9/30; G06F 9/30145; G06F 9/30156; G06F 9/30181; G06F 9/30189; G06F 9/30047; G06F 9/3005; G06F 9/30054; G06F 9/3802; G06F 9/3804; G06F 9/381; G06F 9/3812; G06F 9/3814; G06F 9/3816
   USPC ........ 711/103; 717/140, 142, 143, 151, 152, 717/154, 157, 161, 162; 712/207
   See application file for complete search history.

(56) References Cited

U.S. PATENT DOCUMENTS

| | | | |
|---|---|---|---|
| 7,096,348 B2 | 8/2006 | Moyer et al. | |
| 7,370,152 B2 * | 5/2008 | Woo | G06F 12/0862 711/137 |
| 7,533,242 B1 * | 5/2009 | Moll | G06F 12/0862 711/213 |
| 7,937,573 B2 | 5/2011 | Moyer et al. | |
| 2004/0133769 A1 | 7/2004 | Chaudhry et al. | |
| 2004/0268051 A1 * | 12/2004 | Berg | G06F 9/342 711/137 |
| 2005/0086451 A1 | 4/2005 | Yates et al. | |
| 2006/0004964 A1 | 1/2006 | Conti et al. | |
| 2007/0022422 A1 | 1/2007 | Tirumalai et al. | |
| 2007/0088915 A1 * | 4/2007 | Archambault | G06F 8/4442 711/137 |
| 2010/0088688 A1 * | 4/2010 | Edwards | G06F 8/54 717/151 |
| 2010/0235570 A1 * | 9/2010 | Tsai | G06F 12/0862 711/103 |
| 2011/0238953 A1 | 9/2011 | Metsugi et al. | |
| 2011/0276786 A1 * | 11/2011 | Eichenberger | G06F 8/4442 712/207 |
| 2014/0195781 A1 * | 7/2014 | Mudawar | G06F 9/30 712/205 |

OTHER PUBLICATIONS

Scarff, T., "Program Control Instructions", hosted by Dublin Institute of Technology, School of Electronic and Communications Engineering, retrieved Mar. 2004 via the WayBack Machine, <http://web.archive.org/web/20040326222922/http://www.electronics.dit.ie/staff/tscarff/program_control/program_control.htm>. *

Lin, C., "Conditional and Unconditional Jumps", 2003, hosted by University of Maryland, Computer Science Department, retrieved Apr. 2009 via the WayBack Machine, <http://web.archive.org/web/20090404052042/https://www.cs.umd.edu/class/sum2003/cmsc311/Notes/Mips/jump.html>.*

International Search Report and Written Opinion correlating to PCT/IB2013/050257 dated Aug. 30, 2013.

"Compiler, assembler, linker and loader: a brief story", retrieved from http://www.tenouk.com/ModuleW.html on Dec. 17, 2012.

* cited by examiner

| Format | Opcode Primary (Inst$_{0-5}$) | Opcode Extended (Inst$_{21-31}$) | Mnemonic | Instruction |
|---|---|---|---|---|
| X | 011111 | 00110 01010 0 | addze | Add to Zero Extended with CA |
| X | 011111 | 00110 01010 1 | addze. | Add to Zero Extended with CA & record CR |
| X | 011111 | 10110 01010 0 | addzeo | Add to Zero Extended with CA & record OV |
| X | 011111 | 10110 01010 1 | addzeo. | Add to Zero Extended with CA & record OV & CR |
| X | 011111 | 00000 11100 0 | and | AND |
| X | 011111 | 00000 11100 1 | and. | AND & record CR |
| X | 011111 | 00001 11100 0 | andc | AND with Complement |
| X | 011111 | 00001 11100 1 | andc. | AND with Complement & record CR |
| D | 011100 | — — - | andi. | AND Immediate & record CR |
| D | 011101 | — — - | andis. | AND Immediate Shifted & record CR |
| I | 010010 | — — 0 0 | b | Branch |
| I | 010010 | — — 1 0 | ba | Branch Absolute |

METHOD OF ESTABLISHING PRE-FETCH CONTROL INFORMATION FROM AN EXECUTABLE CODE AND AN ASSOCIATED NVM CONTROLLER, A DEVICE, A PROCESSOR SYSTEM AND COMPUTER PROGRAM PRODUCTS

FIELD OF THE INVENTION

This invention relates to a method of establishing pre-fetch control information from an executable code, and an associated NVM controller, a device, a processor system and computer program products.

BACKGROUND OF THE INVENTION

Microcontrollers may be based on one or more so-called cores, a system bus, other system bus masters, a memory subsystem and peripheral modules, where the memory subsystem includes a flash memory with a pre-fetch buffer mechanism. Internal bus architectures of these devices typically range from 32-bits to 64-bits wide. The flash memory and pre-fetch buffers are typically significantly wider than the system bus. In fact, most often the flash line width is aligned with the width of the system cache lines which is typically 256-bits in currently existing high-end systems.

The flash memory typically has a relatively slow access time in relation to the speed of the core accessing the memory. For example a typical system with a core frequency of 200 MHz or more may have in the region of seven or more cycles to make a read directly from the flash. A pre-fetch buffer mechanism is therefore usually used which aims to improve the overall throughput of data flow from the flash to an accessing master by making speculative data fetches from the flash and storing this data in a small memory array. In this way the data may be fetched and ready to be accessed before the master has requested the access. A problem may arise when the pre-fetch mechanism makes a speculative pre-fetch of data that is not immediately required by the accessing master. This data fetch is usually non-abortable due to the architecture of the flash memory. Then, any further flash accesses must wait for this access to complete which may reduce overall system performance. Further, this unnecessary pre-fetch consumes valid buffer space and removes data fetched at an earlier occasion from the buffer, which may increase the likelihood of another flash access being necessary. This may have a detrimental impact on overall system performance, in contrast to the aim of the pre-fetch buffer mechanism. These effects may especially arise when the executable code comprises one or more Change of Flows (COFs), i.e., instructions that cannot fetched from a linearly incrementing address, but from a distant target address. It may thus be desirable to minimize the number of unnecessary speculative pre-fetches made to the flash memory, especially in a multi-core system which shares a single flash memory or other type of non-volatile memory (NVM).

SUMMARY OF THE INVENTION

The present invention provides a method of establishing pre-fetch control information from an executable code, an NVM controller, a device, a processor system and computer program products as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

In the detailed description, reference may be made to a "flash memory", a "flash controller", "flash lines" and other terms specifically referring to a flash type of non-volatile memory. This is however done for the sake of clarity only: where reference is made to "flash", any suitable non-volatile memory may be read. Further, where reference is made to a "CPU", there is no intention to limit to a "CPU" to a specific meaning: where reference is made to a "CPU", any programmable processor capable to execute a sequence of instructions when the sequence of instructions is loaded in an internal or external memory associated with the programmable processor is intended.

Figure 1:
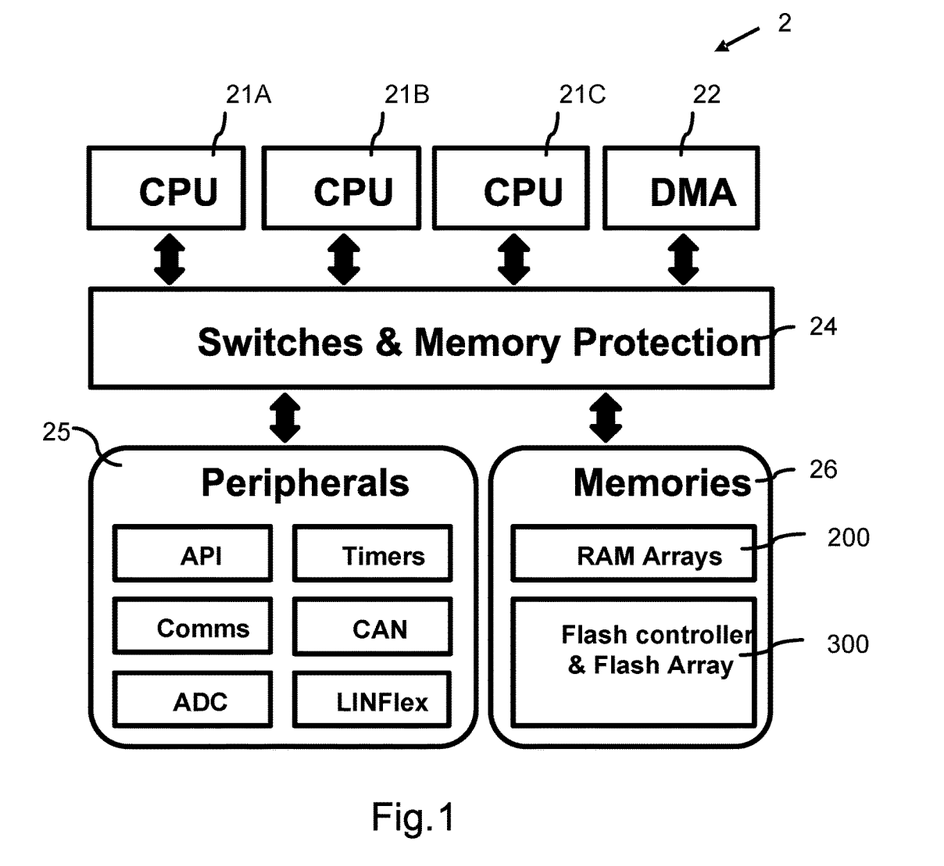
FIG. 1 schematically shows an example of a device comprising a NVM memory for storing one or more executable codes, an associated NVM controller, and one or more processors arranged to execute the one or more executable codes.
Figure 2:
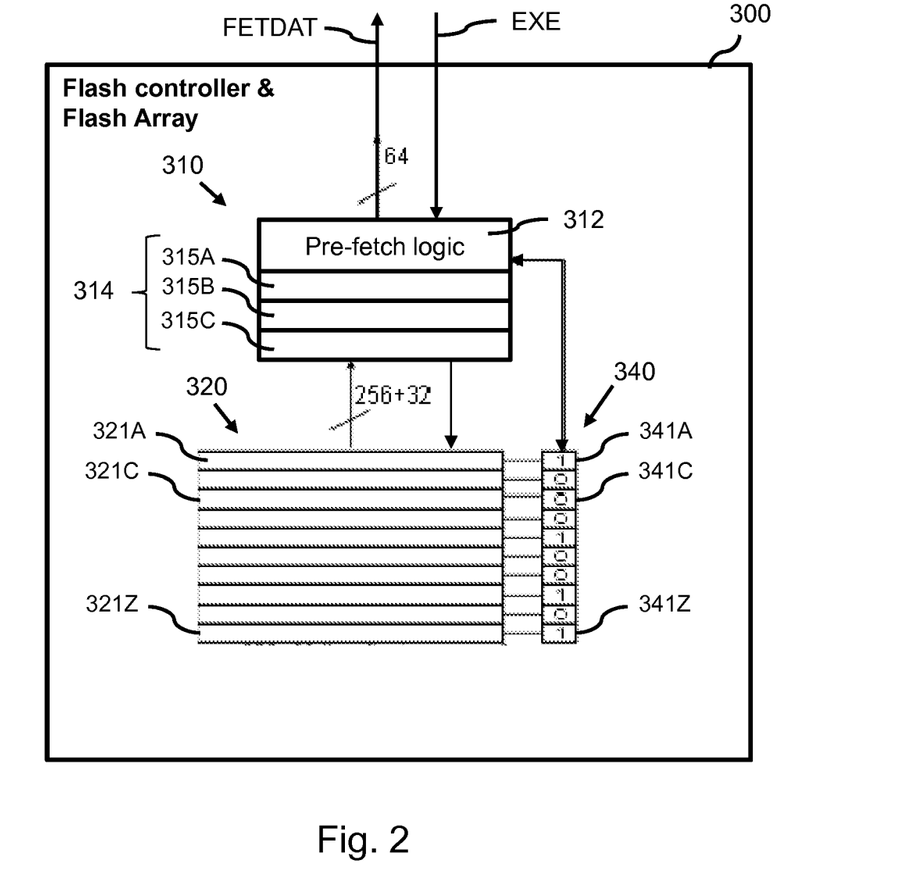
FIG. 2 schematically shows an example of a flash controller and a flash array.

FIG. 1 schematically shows an example of a device 2 comprising a flash memory for storing one or more executable codes EXE, an associated flash controller, and one or more processors arranged to execute the one or more executable codes EXE. FIG. 2 schematically shows an example of a flash controller and a flash memory.

FIG. 1 shows an exemplary device 2. In the non-limiting example shown in FIG. 1, the device is a multi-core/multi-master microprocessor unit (MCU) 2. The MCU 2 comprises a plurality of CPUs 21A, 21B, 21C and a direct memory access processor (DMA) 22 which are arranged to act as system masters. A block labelled "switches and memory protection" 24 is arranged to arbitrate access requests between various system masters 21A, 21B, 21C, 22 and various system slaves. The "switches and memory protection" 24 may e.g. be a system crossbar or some sort of switch fabric. The various system slaves shown in FIG. 1 comprise a plurality of peripherals 25 (showing an arbitrary selection for example purposes only) and memories 26 of different types. The memories 26 include random access memory (RAM) arrays 200 and a non-volatile memories block 300, which may be a flash memory block 300. The non-volatile memories block 300 will further be referred to as flash memory block 300, but may be any type of suitable non-volatile memory.

As shown in FIG. 2, the flash memory block 300 comprises a flash controller 310 and a flash memory 320 comprising a plurality of flash lines. Flash memory 320 may also be referred to as a flash array 320. Three flash lines of the plurality of flash lines are indicated with a reference sign 321A, 321C, 321Z for later reference. The flash controller 310 is arranged to control access to the flash array in response to access requests made by the system masters. The flash controller 310 comprises pre-fetching logic 312 and a pre-fetch buffer 314. The pre-fetch buffer 314 includes memory lines 315A, 315B, and 315C. The flash controller 310 is further arranged to provide flash data FETDAT fetched from the flash memory 320 to the accessing system master. Where the flash data requested by the system master is in the pre-fetch buffer 314, the flash controller 310 provides the pre-fetched data from the pre-fetch buffer 314 to the accessing master. When the flash data requested by the system master is not in the pre-fetch buffer, the flash controller directly access the flash data from the associated flash line of the flash memory 320.

In the exemplary embodiment shown, the flash memory block 300 further comprises a flag area 340, which in turn includes multiple pre-fetch flags, such as pre-fetch flag 341A, pre-fetch flag 341C, and pre-fetch flag 341Z. In alternative embodiments, the flag area may be part of a volatile memory array in the flash memory block, such as a local RAM or a local register array.

The flag area 340 comprises one bit for each flash line of the plurality of flash lines of the flash memory wherein the executable codes of the CPUs 21A, 21B, 21B and, if applicable, the DMA 22 is stored.

Figure 3:
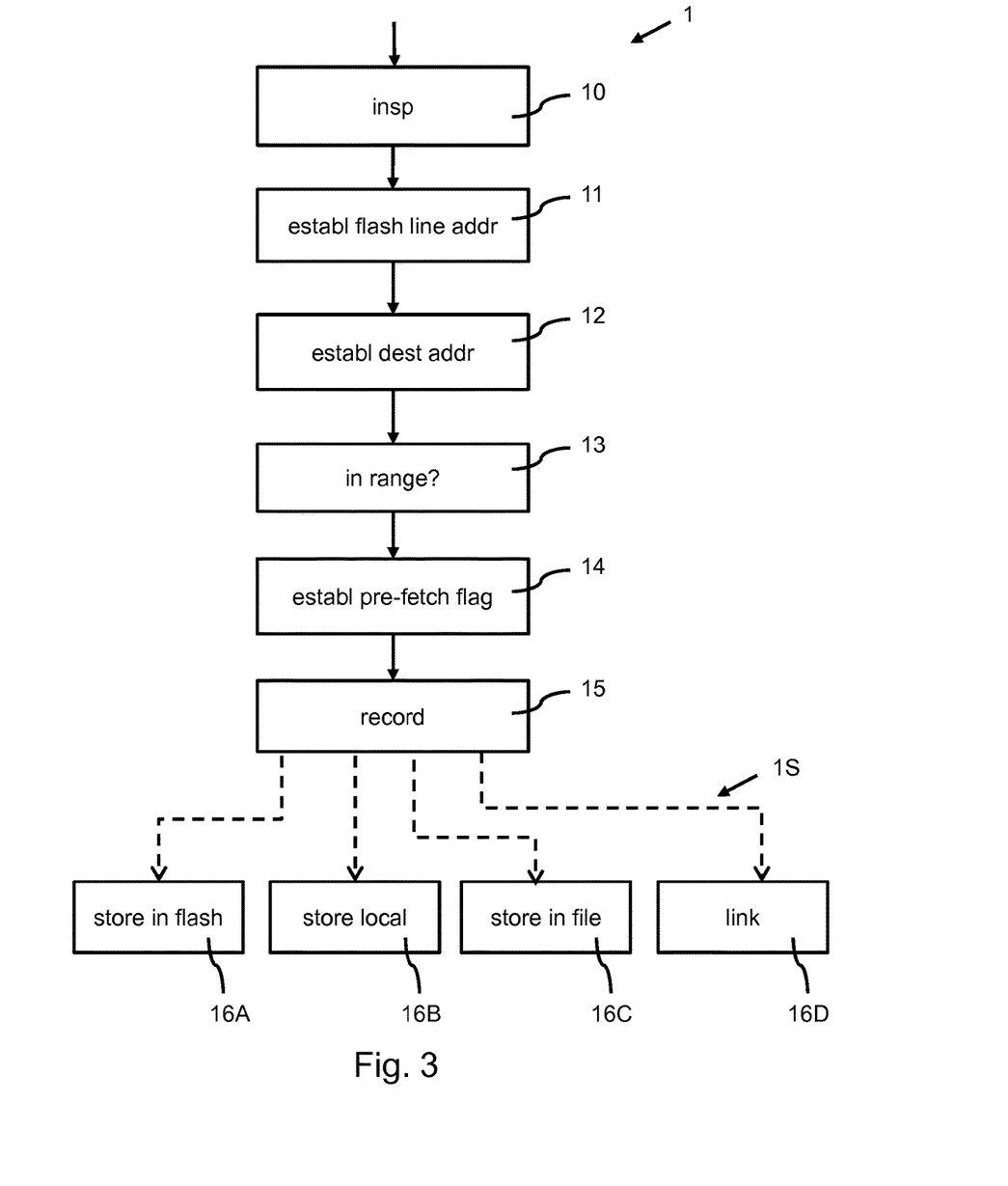
FIG. 3 schematically shows an example of an embodiment of a method of establishing pre-fetch control information from an executable code.

FIG. 3 schematically shows an example of an embodiment of a method 1 of establishing pre-fetch control information from an executable code EXE. The method 1 may be executable by the flash controller 310 upon or after loading an executable code to the flash memory block 300. The method 1 may alternatively be executable by an external unit, apparatus or a processor system of a user interaction system, after which the pre-fetch control information as established by stages 10-15 of the method is loaded to the flash controller 310.

FIG. 3 shows that the method comprises inspecting 10 the executable code to find one or more instructions corresponding to an unconditional change in program flow during an execution of the executable code when the executable code is retrieved from a NVM memory 320 comprising a plurality of NVM lines 321A, 321C, 321Z.

For each unconditional change of flow instruction in the executable code, the method comprises: establishing 11 a NVM line address of the NVM line containing said unconditional change of flow instruction; establishing 12 a destination address associated with the unconditional change of flow instruction; optionally, establishing a branch instruction address associated with the unconditional change of flow instruction; determining 13 whether the destination address is in an address range corresponding to a NVM-pre-fetch starting from said NVM line address; establishing 14 a pre-fetch flag 341A indicating whether the destination address is in the address range corresponding to a NVM-pre-fetch starting from said NVM line address; and recording 15 the pre-fetch flag in a pre-fetch control information record 340.

The flash controller 310 may subsequently perform pre-fetching of flash lines in dependence on the associated pre-fetch flags. As long as there is no COF, the pre-fetch buffers 314 and associated pre-fetching logic 312 within the flash controller 310 may fetch instructions from sequential address locations. However, upon an access to the flash memory by a requesting host, before any further pre-fetch is initiated, the pre-fetch flag associated with the target flash line will be checked to determine whether or not to perform the pre-fetch. Hereby, unnecessary pre-fetches of data that is not immediately required by the accessing master may be prevented. Further, one or more wasted and unnecessary pre-fetches due to an unconditional COF with a target address that does not lie within the pre-fetched data may be prevented.

The method may further comprise storing 16A the pre-fetch control information record in a part of the NVM memory (flash memory); in the example shown in FIG. 3, the pre-fetch control information record 340 is stored in the flag area 340 and for that reason indicated with the same reference number.

The method may comprise storing 16B the pre-fetch control information record in a local fast access temporary storage area, such as a plurality of registers or a RAM array of the NVM controller 310. This may allow for fast and easy access by the flash controller (as long as the local fast access temporary storage area is not flushed).

The method may comprise storing 16C the pre-fetch control information record in a pre-fetch control information file. E.g, where the method stages 10-15 are executed by an external unit, apparatus or processor system of a user interaction system, the external unit, apparatus or processor system of a user interaction system may locally store the pre-fetch control information record in a pre-fetch control information file, and load the pre-fetch control information file later to the flash memory block 300 (e.g., together with loading the executable code EXE).

The method may comprise linking 16D the pre-fetch control information record into a binary file together with the executable code for allowing the pre-fetch control information record to be programmed into the NVM memory together with the executable code when programming the binary file into the NVM memory. In particular where the method stages 10-15 are executed by a processor system including a compiler and a linker, such as an Integrated Development Environment, (IDE), such linking 16D may provide an efficient way of making the pre-fetch control information record available to the flash controller 310, as it may be received by the flash controller 310 together with the executable code in a single programming step. The pre-fetch control information record may also be copied from the NVM memory 320 to a local fast access temporary storage area such as a plurality of registers or a RAM array.

The instruction set 400 of any CPU may be retrieved from e.g. the CPU vendor. Thus, a specific instruction can be identified and decoded relatively easily using the instruction set. For example, a unconditional branch instruction "branch" from a reference manual for an exemplary Power PC CPU is shown in FIG. 6.

Figure 6:
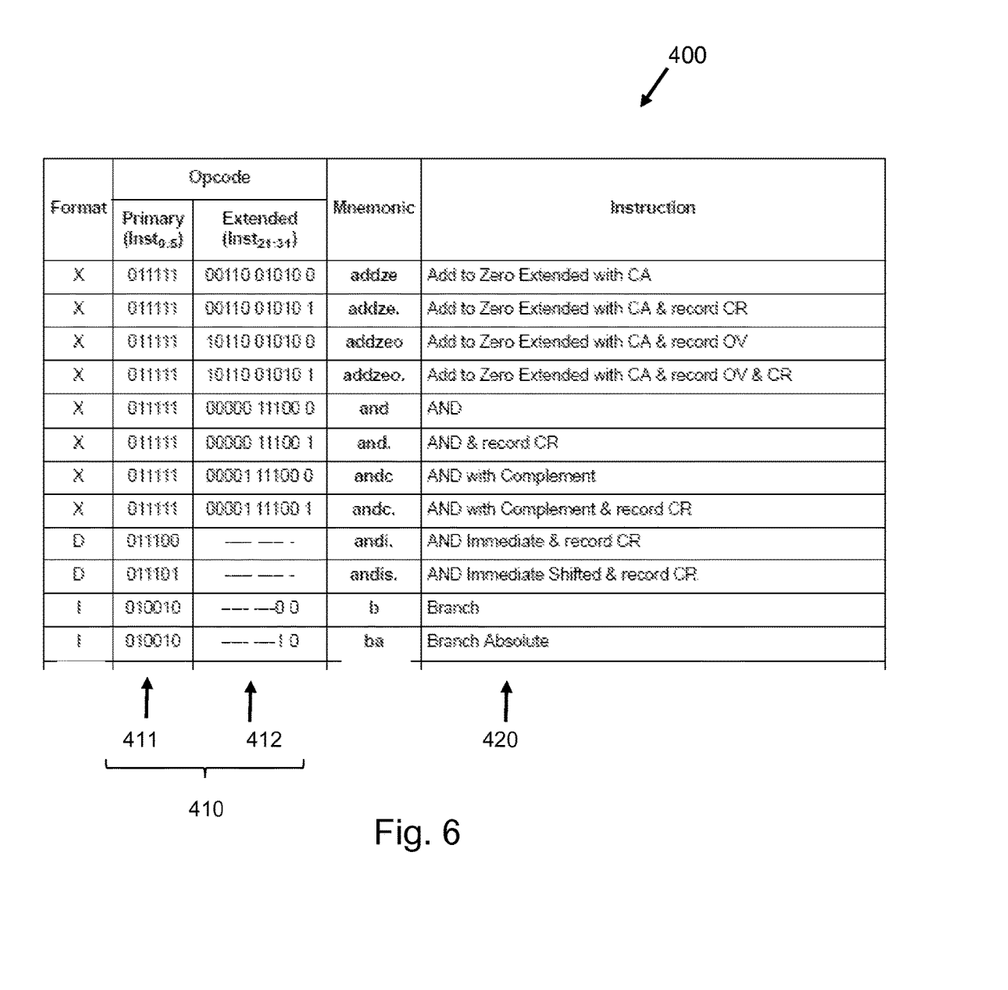
FIG. 6 schematically illustrates an example of a part of an instruction set.

FIG. 6 shows part of an exemplary instruction set 400. The instruction set 400 is represented as a table comprising a plurality of opcodes 410 and defines corresponding instructions 420. The instruction set 400 shows that unconditional branches may be identified from a primary opcode field 411 having value 0x12 (binary 010010) and the associated destination address is given in the following bits, also referred to as the extended opcode 412.

Thus, the inspecting of the executable code to find one or more unconditional flow instructions may comprise checking the executable code for one or more presences of one or more pre-determined primary opcode fields in opcodes of the executable code, and establishing the destination address associated with the unconditional flow instruction comprises retrieving the destination address from an associated extended opcode field in the associated opcode of the executable code.

In an embodiment, each NVM line comprises 256 data bits and, optionally 32 ECC bits, further referred to as a flash line or a 256=32ECC but flash line. Herein, the acronym ECC relates to an Error Correcting Code associated with the data bits. Then, for each 256+32ECC bit flash line, the pre-fetch flag may be represented by an additional bit of information to whether this is a known code discontinuity, i.e. end of function, end of an interrupt handler, end of task, unconditional branch to distant target, etc., for which a pre-fetch shall be omitted. The pre-fetch control information record 340 for a 4 MB flash may then correspond to 16 kB of flags (one for each 256+32 bit line). These 16 kB of flags may be stored in NVM memory as indicated in FIG. 2. This relatively small amount of flags (compared e.g. to a BTB) may further be copied to a local RAM or a local array of registers in the flash memory block 300. In alternative embodiments, each NVM line may comprise another number of data bits, such as for example, 128, 512 or 1024 data bits, and, optionally, a suitably selected number of ECC bits.

In embodiments, the one or more unconditional flow instructions comprise at least one of a branch instruction, an end of function, an end of an interrupt handler, an end of task or a system call instruction.

The method may further specify pre-fetch depths with 2 bits per line allowing to indicate the depth of pre-fetch that should be permitted. Hereby, it may be specified how many lines need to be pre-fetched, thus avoiding the necessity for a static pre-fetching configuration of a fixed number of pre-fetches.

In embodiments, the NVM memory comprises a flash memory. In embodiments, the NVM memory is a flash memory.

The method may be supplemented with branch target buffer [BTB] methods and branch look ahead schemes, of which several examples are commonly known. Such BTBs are used extensively to improve processor performance by reducing the number of cycles spent in execution of branch instructions. Herein, branch target buffers act as a cache of recent branches taken during execution and accelerate branches by providing either a branch target address (address of the branch destination) or one or more instructions at the branch target prior to execution of the branch instruction, which allows a processor to more quickly begin execution of instructions at the branch target address.

Branch look-ahead schemes may also used to accelerate branch processing. Branch look-ahead schemes operate by scanning ahead into the sequential instruction stream during execution, looking for upcoming branch instructions in advance of their execution, and computing branch target addresses of branches early, to allow branch target instructions to be fetched in advance of branch instruction execution, in case the branch is taken.

Branch prediction logic may be used with both BTB and branch look-ahead schemes to allow for an early prediction of the outcome (taken or not taken) of a conditional branch, prior to the resolution of the branch condition, thus allowing for increased branch performance when accuracy of the predictor is high.

Many current branch target buffer designs use an allocation policy that allocates an entry for every branch instruction encountered in the instruction stream during execution. Another approach waits to allocate an entry in the branch target buffer until it is known that a branch is actually taken, since a not-taken branch has a high probability of not being taken on the next execution.

Examples of BTB methods are described in, for example, US patent application 2005/0086451 A1, US patent application 2011/0238953 A1, U.S. Pat. Nos. 7,096,348 and 7,937,573.

US patent application 2005/0086451 A1 describes a microprocessor chip having instruction pipeline circuitry, and instruction classification circuitry that classifies instructions as they are executed into a small number of classes and records a classification code value. An on-chip table has entries corresponding to a range of addresses of a memory and designed to hold a statistical assessment of a value of consulting an off-chip table in a memory of the computer. Lookup circuitry is designed to fetch an entry from the on-chip table as part of the basic instruction processing cycle of the microprocessor. A mask has a value set at least in part by a timer. The instruction pipeline circuitry is controlled based on the value of the on-chip table entry corresponding to the address of instructions processed, the current value of the mask, the recorded classification code, and the off-chip table. Thus, herein, the statistical likelihood of a branch being taken is based on previous behavior (i.e., previous executions of the executable code) rather than a table of pre-fetch flags that is generated prior to execution of the executable code.

In US patent application 2011/0238953 A1, an instruction fetch apparatus is disclosed which includes: a detection state setting section configured to set the execution state of a program of which an instruction pre-fetch timing is to be detected; a program execution state generation section configured to generate the current execution state of the program; an instruction pre-fetch timing detection section configured to detect the instruction pre-fetch timing in the case of a match between the current execution state of the program and the set execution state thereof upon comparison therebetween; and an instruction pre-fetch section configured to pre-fetch the next instruction upon detection of the instruction pre-fetch timing. It subsequently behaves like a classic branch target buffer and relies on a cache of addresses, like a BTB.

U.S. Pat. No. 7,096,348 from Freescale Semiconductors Inc describes a method and apparatus for allocating entries in a branch target buffer (BTB) in a pipelined data processing system which includes: sequentially fetching instructions; determining that one of the instructions is a branch instruction; decoding the branch instruction to determine a branch target address; determining if the branch target address can be obtained without causing a stall condition in the pipelined data processing system; and selectively allocating an entry of the BTB based on the determination. In one embodiment, an entry of the BTB is allocated if the branch instruction is not loaded into a predetermined slot of a pre-fetch buffer and no other stall condition will occur. The method and apparatus combine effects of using a BTB and branch lookahead to reduce stall conditions in the data processing system.

U.S. Pat. No. 7,937,573 from Freescale Semiconductors Inc describes a method and data processing system allocates entries in a branch target buffer (BTB). Instructions are fetched from a plurality of instructions and one of the plurality of instructions is determined to be a branch instruction. A corresponding branch target address is determined. A determination is made whether the branch target address is stored in a branch target buffer (BTB). When the branch target address is not stored in the branch target buffer, an entry in the branch target buffer is identified for allocation to receive the branch target address based upon stored metrics such as data processing cycle saving information and branch prediction state. In one form the stored metrics are stored in predetermined fields of the entries of the BTB.

Methods according to embodiments of the invention may however also be used without using a branch target buffer, or by also using BTB methods to handle conditional branches. Thus, rather than solely using pre-fetch prediction based on previous behaviour, in these cases, a portion of the prediction may be statically defined up front at compile time. This may result in a performance improvement on devices, such as cost sensitive single NVM array devices with multi core.

Further, the BTB reacts to what it thinks the behavior will be based on previous experience. So for example, if a branch has been taken consistently, then the BTB will assume that the next time it occurs it will also be taken. The BTB could be considered to be more tailored towards conditional branches and a less efficient method for predicting unconditional branches. So, for an unconditional COF, the BTB may get it wrong first, before later on increasing its likelihood of getting it right. However, as the BTB is typically a relatively small cache with a relatively low number of entries, there is a risk that the BTB may never detect such unconditional branches as there is a risk that the associated earlier entry is flushed from the BTB before the unconditional branch is taken again later on during execution. It may thus be advantageous to avoid the need that a BTB system has to either learn and adapt accordingly from previous executions, or to have a user to somehow simulate and profile an executable code.

With regards to multi-core, the BTB is a CPU resident feature, embedded within the CPU pipeline that relies on an address of a branch instruction being recognized and matched to a BTB entry within the CPU and thus taking appropriate actions, such as deciding whether or not to take branch based on previous history. This is deeply embedded within pipeline of real-time core operation, whereas one or more embodiments of the method according to the invention may be resident local to the flash controller which is shared by all masters and may thus be capable to handle multi-core operation with a single, shared flash memory better than known BTB methods.

FIG. 2 schematically shows an example of a flash memory block 300 comprising a flash controller 310 arranged to control data storage and retrieval from a flash array 320, where the flash controller 310 is arranged to perform a method 1 of establishing pre-fetch control information comprising one or more pre-fetch flags from the executable code EXE according to any one of the embodiments described above or derivable from the embodiments and further features described herein.

FIG. 2 schematically shows a NVM controller 310 associated with a NVM memory 320. The NVM controller comprises a pre-fetch logic 312 and a pre-fetch buffer 314. The pre-fetch logic 312 is arranged to operate in a setup phase prior to execution of the executable code EXE and in a, later, execution phase associated with execution of the executable code EXE.

The pre-fetch logic 312 is arranged to, in the setup-phase, receive an executable code EXE for storing in a NVM memory 320; store the executable code EXE in the NVM memory 320 (also referred to as "programming"); and perform a method 1 of establishing pre-fetch control information comprising one or more pre-fetch flags 341A from the executable code EXE.

The pre-fetch logic 312 is arranged to, in the execution phase, pre-fetch data 321A from the NVM memory 320 according to one or more pre-fetch flags 341A established by said method, and store the pre-fetched data in the pre-fetch buffer 314.

Figure 4:
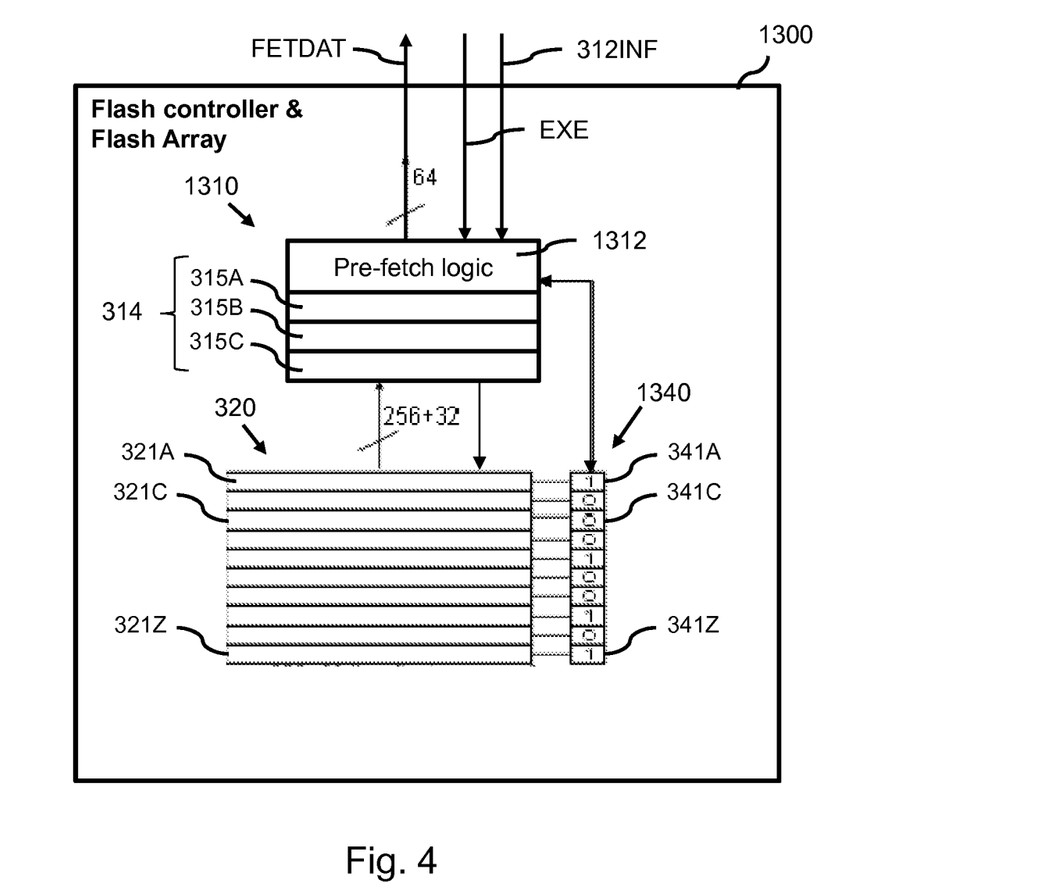
FIG. 4 schematically shows another example of a flash controller and a flash array.

FIG. 4 schematically shows schematically shows another example of a flash memory block 1300. The flash memory block 1300 shown in FIG. 4 comprises a flash controller 1310 arranged to control data storage and retrieval from a flash array 320, where the flash controller 1310 is arranged to receive externally determined pre-fetch control information (312INF) comprising one or more pre-fetch flags associated with the executable code.

FIG. 4 thus shows a NVM controller 1310 associated with a NVM memory 320. The NVM controller 1310 comprises a pre-fetch logic 1312 and a pre-fetch buffer 314. The pre-fetch buffer 314 includes memory lines 315A, 315B, and 315C. The pre-fetch logic 1312 is arranged to operate in a setup phase prior to execution of the executable code EXE and in a, later, execution phase associated with execution of the executable code EXE.

The pre-fetch logic 1312 is arranged to, in the setup-phase, receive an executable code (EXE) for storing in a NVM memory 320; store the executable code EXE in the NVM memory 320; and receive pre-fetch control information 312INF comprising one or more pre-fetch flags associated with the executable code, the pre-fetch control 321INF information being established externally according to embodiments of the method described with reference to FIG. 3.

The pre-fetch logic 1312 is arranged to, in the execution phase, pre-fetch data from the NVM memory according to one or more pre-fetch flags 341A established by said method, and store the pre-fetched data in the pre-fetch buffer 314.

Thus, in the example shown in FIG. 4, the NVM controller does not perform the method stages 10-15 itself, but receives it from an external unit, e.g. a dedicated tool, a linker/compiler or an Integrated Development Environment IDE.

The pre-fetch logic 312, 1312 of the NVM controllers 310, 1310 shown in FIG. 2 and FIG. 4 may further be arranged to, in the setup-phase, store at least the pre-fetch flags established by said method in the NVM memory.

The pre-fetch logic 312, 1312 may further be arranged to, at a start of the execution phase, retrieve at least the pre-fetch flags established by said method from the NVM memory; copy the pre-fetch flags to a local fast access temporary storage area, such as a plurality of registers or a RAM array of the NVM controller.

The pre-fetch logic 312, 1312 may further be arranged to, during the execution phase and before fetching a NVM line from the NVM memory, retrieve associated pre-fetch flags from the local fast access temporary storage area. The pre-fetch logic 312, 1312 may further be arranged to use the associated pre-fetch flags to determine whether a pre-fetch of a NVM line is to be performed, and, if a pre-fetch of the NVM line is to be performed, fetch the NVM line from the NVM memory.

The pre-fetch logic 312, 1312 of the NVM controllers 310, 1310 shown in FIG. 2 and FIG. 4 may alternatively be further arranged to, in the setup-phase, store at least the pre-fetch flags established by said method to a local fast access temporary storage area, such as a plurality of registers or a RAM array of the NVM controller.

Such pre-fetch logic 312, 1312 may further be arranged to, during the execution phase and before fetching a NVM line from the NVM memory, retrieve associated pre-fetch flags from the local fast access temporary storage area. Such pre-fetch logic 312, 1312 may further be arranged to use the associated pre-fetch flags to determine whether a pre-fetch of a NVM line is to be performed, and, if a pre-fetch of the NVM line is to be performed, fetch the NVM line from the NVM memory.

The pre-fetch logic 312, 1312 may further be arranged to, during the execution phase, provide pre-fetched data to a processor 21A.

The pre-fetch logic 312, 1312 may further be arranged to, during the execution phase, provide non-pre-fetched data to a processor 21A, if the data requested by the processor 21A is not present in the pre-fetch buffer 314.

The NVM controller may be arranged to receive a single executable code associated with one processor 21A and arranged to pre-fetch from the NVM memory according to pre-fetch flags established by said method for the executable code of said processor 21A.

As FIG. 1 indicates, the NVM controller may alternatively be arranged to receive a plurality of executable codes associated with a corresponding plurality of processors 21A, 21B, 21C, 22, and arranged to pre-fetch from the NVM memory according to pre-fetch flags established by said method for each of the executable codes and each of the processors.

The NVM controller may comprise or consist of a flash controller. The NVM memory may comprise or consist of a flash memory.

Figure 5:
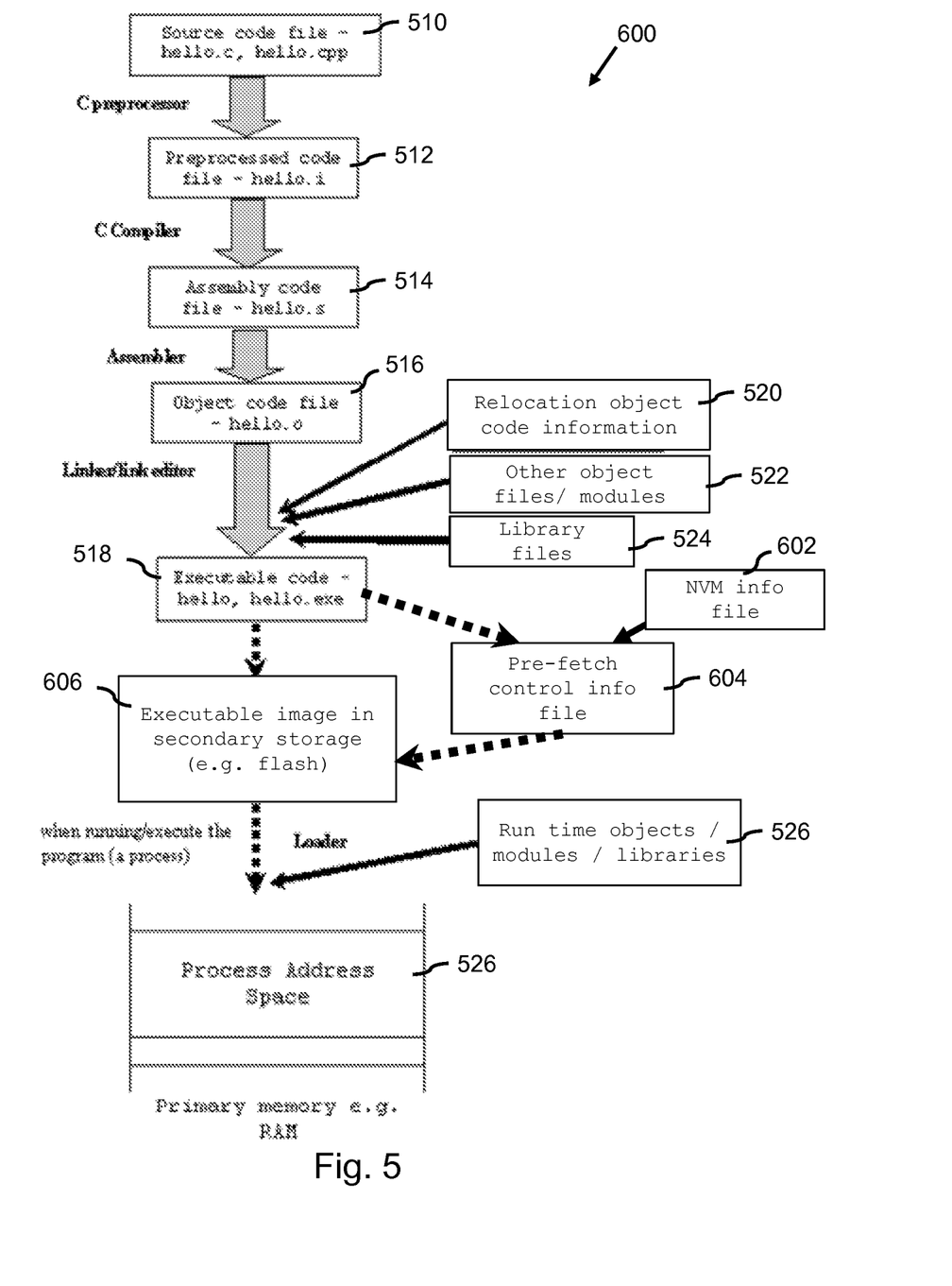
FIG. 5 schematically illustrates an example of a program and execution process.

FIG. 5 schematically illustrates an example of a program and execution process 600. The program and execution process may, for example, be executed using an Integrated Development Environment (IDE). The example comprises known compile, link and execute stages 510, 512, 514, 516, 518, 520, 522, 524, 526 for running the program and associated file types as described on webpage "Compiler, assembler, linker and loader: a brief story" www.tenouk-.com/ModuleW and is extended with specific elements 602, 604 according to embodiments. Hereby, an executable image 606 may be obtained and stored in a secondary storage such a flash array 320, which may, when running/executing the program as a process be loaded into address space 526 in a primary memory such as RAM arrays 200 of memories 26.

FIG. 5 schematically illustrates such example of the program and execution process using a C's program building process. The known stages utilize different 'tools' such as a preprocessor, compiler, assembler, and linker for obtaining executable file 518. The stages that happen in order regardless of operating system/compiler may be listed to comprise a preprocessing stage 510 which is arranged to process one or more source files written in C, illustrated as hello.c and hello.cpp, together with include-files, conditional compilation instructions and macros, to obtain a preprocessed code file hello.i 512. A next stage comprises compilation by a C compiler, which takes the output of the pre-processor and generates assembler source code hello.s 514. A next stage is assembly, which takes the assembly source code hello.s and produces an assembly listing with offsets as assembler output. The assembler output is stored in an object file hello.o 516. A next known stage us linking, which takes the object file hello.o and, possibly, one or more of an relocation object code information 520, one or more other object files or modules 522, and/or one or more library files 524 as input and combines them to produce a single executable file hello.exe 518. In doing so, references to external symbols may be resolved, addresses may be assigned to procedures/functions and variables, and code and data may be revised to reflect new addresses in a process also known as relocation. The object and executable may come in several formats such as commonly used formats known as ELF (Executable and Linking Format) and COFF (Common Object-File Format). In known systems, may the executable file hello.exe 518 be stored as an executable image in secondary storage such as an NVM memory (e.g., a flash array 320), from which it may be loaded into a process address space 526 in, e.g., RAM for being executed.

According to embodiments, the program and execution process 600 may further comprise reading NVM information from an NVM information file 602 to establish the NVM memory information comprising NVM line addresses associated with a plurality of NVM lines of the NVM memory, establishing one or more pre-fetch flags from the executable code 518 and the NVM information, and storing the one or more pre-fetch flags as part of a pre-fetch control information record 340 in a pre-fetch control information file 604. The program and execution process 600 may then store at least the pre-fetch flags as established in the NVM memory together with the executable file 518; the stored pre-fetch flags and the executable file 518 as stored in NVM memory may in that case together be referred to as "binary file 606". Alternatively, the program and execution process 600 may, e.g., link the pre-fetch control information record together with the executable code to obtain a single binary file 606 for allowing the pre-fetch control information record to be programmed into the NVM memory together with the executable code when programming the binary file into the NVM memory. The single binary file 606 may thus be stored as executable image in the NVM memory forming a secondary storage, from which it may be loaded into a process address space 526 in, e.g., RAM for being executed.

Figure 7:
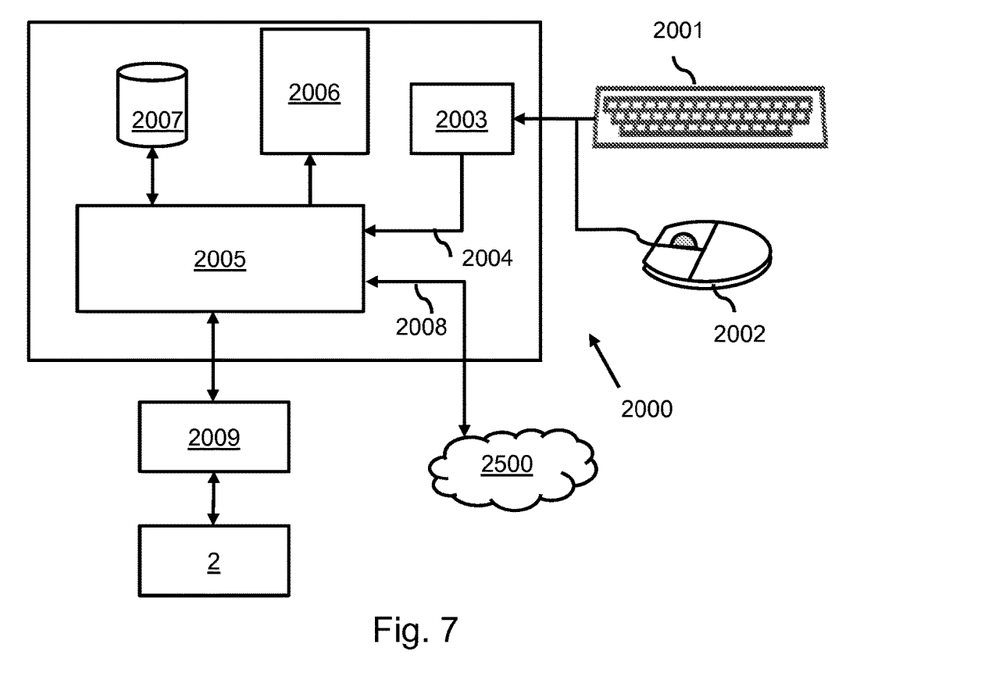
FIG. 7 schematically shows an exemplary user interaction system with an exemplary processor system.

FIG. 7 schematically shows an exemplary user interaction system 2000 having a programmable processor 2005. The user interaction system 2000 is shown to be a personal computer, but may be any type of suitable user interaction system 2000. The user interaction system 2000 further comprises a storage unit 2007, a user input 2003 and a display 2006. The user input 2003 allows the user to input user data and user instructions 2004 to the processor 2005 by e.g. using a keyboard 2001 or a mouse 2002. Also, although not shown, the display 2006 may comprise a touch-sensitive surface for enabling the user to provide user data and user instructions to the user input 2003 by means of touching the display 2006. The processor 2005 is arranged to perform any one of the methods according to the invention, to receive user data and user instructions 2004, to present visual information on the display 2006 and to communicate with a data I/O device 2009, such as an optical disc drive or a solid state reader/writer. The processor 2005 is arranged to cooperate with the storage unit 2007, allowing storing and retrieving information on the storage unit 2007, such as a source code file, an assembly code file, an object code file, an executable code file, a file comprising the pre-fetch control information record, or a binary file wherein the pre-fetch control information record is linked together with the executable code for allowing the pre-fetch control information record to be programmed into the NVM memory together with the executable code when programming the binary file into the NVM memory. The user interaction system 2000 may further comprise a communication channel 2008 allowing the processor 2005 to connect to an external cloud 2500 for communicating with other devices in the cloud. The external cloud may e.g. be the Internet. The processor 2005 may also be arranged to retrieve an assembly code file, an object code file, an executable code file, a file comprising the pre-fetch control information record, or a binary file wherein the pre-fetch control information record is linked together with the executable code for allowing the pre-fetch control information record to be programmed into the NVM memory together with the executable code when programming the binary file into the NVM memory determined during earlier or further executions of the method from the storage unit 2007, or from another device in the cloud 2500. The processor 2005 may be capable to read, using the data I/O device 2009, a computer readable medium comprising a program code. The processor 2005 may be capable to read, using the data I/O device 2007, a computer readable medium comprising a computer program product comprising instructions for causing the user interaction system 2000 to perform a method according to an embodiment.

Hereto, the processor system 2005 may be arranged to obtain an executable code EXE suitable to be programmed in a NVM memory 320 from receiving an executable code (e.g., from retrieving from storage unit 2007 or from another device in the cloud 2500). The processor system 2005 may alternatively be arranged to obtain an executable code EXE suitable to be programmed in a NVM memory 320 from generating an executable code from at least one of an object code file, an assembly code, a pre-processed code, a source code, and one or more library files (e.g., from using a compiler and a linker).

The processor system 2005 may further be arranged to establish NVM memory information associated of the NVM memory, the NVM memory information comprising NVM line addresses associated with a plurality of NVM lines of the NVM memory.

The processor system 2005 may further be arranged to perform a method of establishing pre-fetch control information from the executable code according to any one the embodiments described above.

The processor system 2005 may further be arranged to make the pre-fetch control information record available for being programmed in the NVM memory from storing the pre-fetch control information record in a pre-fetch control information file.

Alternatively or additionally, the processor system 2005 may further be arranged to make the pre-fetch control information record available for being programmed in the NVM memory from linking the pre-fetch control information record into a binary file together with the executable code for allowing the pre-fetch control information record to be programmed into the NVM memory together with the executable code when programming the binary file into the NVM memory.

A user may further operate the user interaction system 2000 to program the executable code EXE and the pre-fetch control information record into device 2 via a programming interface 2009.

Where the processor system is arranged to generating an executable code from at least one of an object code file, an assembly code, a pre-processed code, a source code, and one or more library files, the processor system may comprise a compiler and linker. Such embodiment may thus use the knowledge by the compiler and linker that a COF is unconditional to signal to the pre-fetching mechanism not to perform a pre-fetch. Further, this may be based upon knowledge of the target address to selectively enable pre-fetching even on an unconditional COF if the target address is known to fall within an address range that would have been pre-fetched.

According to an embodiment, an accompanying file may be generated by the compiler and linker, or a tool suite comprising the compiler and linker. This file may comprise or consist of a list of flags indicating whether each flash line of data contains an unconditional COF with a known target address that will not be within the data fetched by the pre-fetch mechanism. Each flag corresponds to a flash line (e.g., 256 bits between 8 and 16 instructions based on a Very Long Extended (VLE) instruction set and assuming no data). This file may then be stored in non-volatile on the host MCU of the processor system. Upon start up this may be copied to a small RAM array to provide a more immediate comparison mechanism. Upon an access to the memory by a requesting host, before any further pre-fetch is initiated the status flag associated with the target flash line will be checked to gate whether or not to perform the pre-fetch.

Conditional COFs may be handled using, e.g., classical BTB methods.

Figure 8:
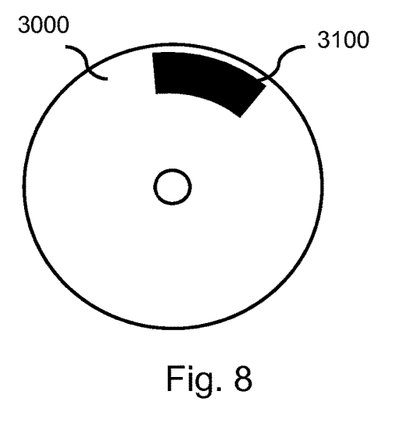
FIG. 8 shows a computer readable medium comprising a computer program product comprising instructions for causing for causing a NVM controller to perform an exemplary method.

FIG. 8 shows a computer readable medium comprising a computer program product 3100 comprising instructions for causing for causing a NVM controller to perform an exemplary method.

The computer program product 3100 may be embodied on the computer readable medium 3000 as physical marks or by means of magnetization of the computer readable medium 3000. However, any other suitable embodiment is conceivable as well. Furthermore, it will be appreciated that, although the computer readable medium 3000 is shown in FIG. 8 as an optical disc, the computer readable medium 3000 may be any suitable computer readable medium, such as a hard disk, solid state memory, flash memory, etc., and may be non-recordable or recordable.

The computer program product 3100 comprises instructions for causing an NVM controller 310 comprising NVM control logic 312 to perform a method of establishing pre-fetch control information from the executable code according to any one the embodiments described above. The computer program product 3100 may thus be used to program the NVM controller.

Figure 9:
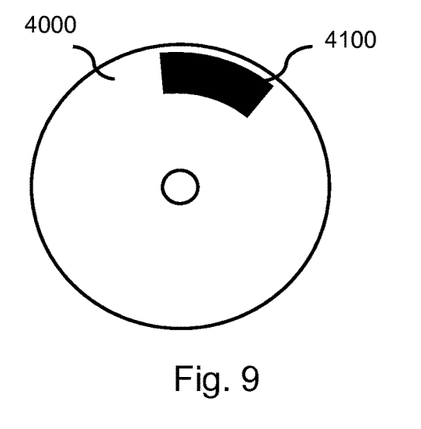
FIG. 9 shows a computer readable medium comprising a computer program product comprising instructions for causing for causing a processor system to perform an exemplary method.

FIG. 9 shows a computer readable medium comprising a computer program product 4100 comprising instructions for causing for causing a processor system to perform an exemplary method.

The computer program product 4100 comprises instructions for causing a processor system 2005 to obtain an executable code EXE suitable to be programmed in a NVM memory from receiving an executable code (e.g., from retrieving from storage unit 2007 or from another device in the cloud 2500). The computer program product 4100 comprising instructions for causing a processor system 2005 to obtain an executable code EXE suitable to be programmed in a NVM memory from generating an executable code from at least one of an object code file, an assembly code, a pre-processed code, a source code, and one or more library files.

The computer program product 4100 may further comprise instructions for causing a processor system 2005 to establish NVM memory information associated of the NVM memory, the NVM memory information comprising NVM line addresses associated with a plurality of NVM lines of the NVM memory, and to-perform a method of establishing pre-fetch control information from the executable code according to any one of the embodiments described above.

The computer program product 4100 may further comprise instructions for causing a processor system 2005 to make the pre-fetch control information record available for being programmed in the NVM memory from storing the pre-fetch control information record in a pre-fetch control information file.

Alternatively or additionally, the computer program product 4100 may further comprise instructions for causing a processor system 2005 to link the pre-fetch control information record into a binary file together with the executable code for allowing the pre-fetch control information record to be programmed into the NVM memory together with the executable code when programming the binary file into the NVM memory.

The computer program product 4100 may thus comprise tool suite software for, for example, am Integrated Development Environment.

The described methods and systems may be used with a programmable target of the same type as used in a practical application or in a practical system. The described methods and systems may also be used with a programmable target that performs an emulation of a programmable processor of a different type or even with a programmable target that performs an emulation of a non-programmable processor of a practical application or practical system. Such emulation may e.g. be advantageously used during the application or system development stage.

An operating system (OS) is the software that manages the sharing of the resources of a computer and provides programmers with an interface used to access those resources. An operating system processes system data and user input, and responds by allocating and managing tasks and internal system resources as a service to users and programs of the system.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

As used herein, the term "bus" is used to refer to a plurality of signals or conductors which may be used to transfer one. The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program" as used herein, is defined as a sequence of instructions designed for execution on a computer system. A program, or computer program, may include a subroutine, a function, a procedure, an object method, an object implementation, an executable application, an applet, a servlet, a source code, an object code, a shared library/ dynamic load library and/or other sequence of instructions designed for execution on a computer system.

Some of the above embodiments, as applicable, may be implemented using a variety of different information processing systems. For example, although the figures and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 4000, for example, from computer readable media such as memory or other media on other computer systems. Such computer readable media may be permanently, removably or remotely coupled to an information processing system such as system 4000. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 4000 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of establishing pre-fetch control information from an executable code, the method comprising:
   inspecting the executable code to find one or more instructions corresponding to an unconditional change in program flow during an execution of the executable code when the executable code is retrieved from a non-volatile memory [NVM] comprising a plurality of NVM lines; and
   for each unconditional change of flow instruction in the executable code:
      establishing a NVM line address of the NVM line containing said unconditional change of flow instruction;
      establishing a destination address associated with the unconditional change of flow instruction;
      determining whether the destination address is in an address range corresponding to a NVM-pre-fetch starting from said NVM line address;
      establishing a pre-fetch flag indicating whether the destination address is in the address range corresponding to a NVM-pre-fetch starting from said NVM line address; and
      recording the pre-fetch flag in a pre-fetch control information record.

2. A method according to claim 1, the method further comprising:
   storing the pre-fetch control information record in a part of the NVM memory.

3. A method according to claim 1, the method further comprising:
   storing the pre-fetch control information record in a local fast access temporary storage area, such as a plurality of registers or a RAM array of the NVM controller.

4. A method according to claim 1, the method further comprising:
   storing the pre-fetch control information record in a pre-fetch control information file.

5. A method according to claim 1, the method further comprising:

linking the pre-fetch control information record into a binary file together with the executable code for allowing the pre-fetch control information record to be programmed into the NVM memory together with the executable code when programming the binary file into the NVM memory.

6. A method according to claim 1, wherein:
the inspecting the executable code to find one or more unconditional change of flow instructions comprises checking the executable code for one or more presences of one or more pre-determined primary opcode fields in opcodes of the executable code, and
establishing the destination address associated with the unconditional change of flow instruction comprises retrieving the destination address from an associated extended opcode field in an associated opcode of the executable code.

7. A method according to claim 1, wherein each NVM line comprises 256 data bits and, optionally 32 ECC bits.

8. A method according to claim 1, wherein the NVM memory is a flash memory.

9. A method according to claim 1, wherein the one or more unconditional change of flow instructions comprise at least one of a branch instruction, an end of function, an end of handler, an end of task, and a system call instruction.

10. A NVM controller associated with a NVM memory, the NVM controller comprising a pre-fetch logic and a pre-fetch buffer,
the pre-fetch logic being arranged to:
in a setup-phase prior to execution of the executable code:
receive an executable code for storing in a NVM memory;
store the executable code in the NVM memory; and
receive pre-fetch control information comprising one or more pre-fetch flags associated with the executable code, the pre-fetch control information being established externally according to claim 1; and
in an execution phase associated with execution of the executable code:
pre-fetch pre-fetched data from the NVM memory according to one or more pre-fetch flags established by said method, and
store the pre-fetched data in the pre-fetch buffer.

11. A NVM controller according to claim 10, the pre-fetch logic further arranged to:
in the setup-phase, store at least the pre-fetch flags established by said method in the NVM memory;
at a start of the execution phase:
retrieve at least the pre-fetch flags established by said method from the NVM memory,
copy the pre-fetch flags to a local fast access temporary storage area, such as a plurality of registers or a RAM array of the NVM controller,
during the execution phase:
before fetching a NVM line from the NVM memory, retrieve associated pre-fetch flags from the local fast access temporary storage area,
using the associated pre-fetch flags to determine whether a pre-fetch of a NVM line is to be performed, and
if a pre-fetch of the NVM line is to be performed, fetching the NVM line from the NVM memory.

12. A NVM controller according to claim 10, the pre-fetch logic further arranged to:
in the setup-phase, store at least the pre-fetch flags established by said method to a local fast access temporary storage area, such as a plurality of registers or a RAM array of the NVM controller;
during the execution phase:
before fetching a NVM line from the NVM memory, retrieve associated pre-fetch flags from the local fast access temporary storage area,
using the associated pre-fetch flags to determine whether a pre-fetch of a NVM line is to be performed, and
if a pre-fetch of the NVM line is to be performed, fetching the NVM line from the NVM memory.

13. A NVM controller associated with a NVM memory, the NVM controller comprising a pre-fetch logic and a pre-fetch buffer,
the pre-fetch logic being arranged to:
in a setup-phase prior to execution of executable code, inspect the executable code to find a instruction corresponding to an unconditional change in program flow, for the unconditional change of flow instruction in the executable code:
receive an executable code for storing in a NVM memory;
store the executable code in the NVM memory; and
establish pre-fetch control information comprising one or more pre-fetch flags from the executable code; and
in an execution phase associated with execution of the executable code:
pre-fetch pre-fetched data from the NVM memory according to one or more pre-fetch flags, and
store the pre-fetched data in the pre-fetch buffer.

14. A NVM controller according to claim 13, the pre-fetch logic further arranged to:
during the execution phase, provide pre-fetched data to a processor.

15. A NVM controller according to claim 13, the NVM controller being arranged to receive a plurality of executable codes associated with a corresponding plurality of processors, and arranged to pre-fetch from the NVM memory according to pre-fetch flags established by said method for each of the executable codes and each of the processors.

16. A NVM controller according to claim 13, the NVM controller comprising a flash controller and the NVM memory comprising a flash memory.

17. A device comprising a NVM memory for storing one or more executable codes, an associated NVM controller according to claim 13, and one or more processors arranged to execute the one or more executable codes.

18. A processor system arranged to:
obtain an executable code suitable to be programmed in a NVM memory from:
receiving an executable code, or
generating an executable code from at least one of an object code file, an assembly code, a pre-processed code, a source code, and one or more library files;
inspect the executable code to find a instruction corresponding to an unconditional change in program flow, for the unconditional change of flow instruction in the executable code:
establish NVM memory information associated of the NVM memory, the NVM memory information comprising NVM line addresses associated with a plurality of NVM lines of the NVM memory,
perform a method of establishing pre-fetch control information comprising pre-fetch flag from the executable code, and make a pre-fetch control information record available for being programmed in the NVM memory from:
    storing the pre-fetch control information record in a pre-fetch control information file, or
    linking the pre-fetch control information record into a binary file together with the executable code for allowing the pre-fetch control information record to be programmed into the NVM memory together with the executable code when programming the binary file into the NVM memory.

* * * * *